US010635293B2

(12) United States Patent
Dietz (10) Patent No.: US 10,635,293 B2
(45) Date of Patent: Apr. 28, 2020

(54) METHOD AND SYSTEM FOR ENABLING THE SHARING OF INFORMATION BETWEEN APPLICATIONS ON A COMPUTING DEVICE (71) Applicant: OpenPeak LLC, Plano, TX (US)

(72) Inventor: Carsten Michael Dietz, Boynton Beach, FL (US)

( * ) Notice: Subject to any disclaimer, the term of this patent is extended or adjusted under 35 U.S.C. 154(b) by 184 days.

(21) Appl. No.: 15/906,397

(22) Filed: Feb. 27, 2018

(65) Prior Publication Data
US 2018/0188921 A1 Jul. 5, 2018

Related U.S. Application Data (62) Division of application No. 14/730,517, filed on Jun. 4, 2015, now Pat. No. 9,916,079.

(60) Provisional application No. 62/008,280, filed on Jun. 5, 2014.

(51) Int. Cl.
*G06F 3/0488* (2013.01)
(52) U.S. Cl.
CPC .................. *G06F 3/0488* (2013.01)
(58) Field of Classification Search
CPC ...................................... G06F 3/0488
USPC ....................................... 715/769
See application file for complete search history.

(56) References Cited

U.S. PATENT DOCUMENTS

| 8,175,653 | B2 * | 5/2012 | Smuga | H04M 1/72522 |
| | | | | 455/566 |
| 9,014,661 | B2 | 4/2015 | deCharms | |
| 9,015,616 | B2 * | 4/2015 | Tseng | G06F 1/1624 |
| | | | | 715/781 |
| 9,411,830 | B2 | 8/2016 | Mei et al. | |
| 9,690,400 | B2 | 6/2017 | Krishnakumar et al. | |
| 9,791,979 | B2 | 10/2017 | Pacheco et al. | |
| 9,804,733 | B2 | 10/2017 | Walline et al. | |
| 9,916,079 | B2 * | 3/2018 | Dietz | G06F 3/0488 |
| 10,122,838 | B2 * | 11/2018 | Shuttleworth | G06F 3/0482 |
| 10,346,479 | B2 * | 7/2019 | Uphoff | G06F 16/148 |
| 2009/0058820 | A1 * | 3/2009 | Hinckley | G06F 3/017 |
| | | | | 345/173 |
| 2009/0083232 | A1 * | 3/2009 | Ives | G06F 16/951 |
| 2010/0087230 | A1 * | 4/2010 | Peh | G06F 3/04817 |
| | | | | 455/566 |
| 2010/0100839 | A1 * | 4/2010 | Tseng | G06F 1/1624 |
| | | | | 715/780 |
| 2013/0061166 | A1 * | 3/2013 | Seo | G06F 3/0484 |
| | | | | 715/780 |

(Continued)

Primary Examiner — William D Titcomb (57) ABSTRACT

A method and system for enabling the sharing of information between a first application and a second application on a computing device are described herein. The method includes the steps of receiving a global search request through the first application and—in response to the reception of the global search request—prompting for a search term from a user. The method further includes the steps of receiving the search term and—based on the received search term—automatically presenting one or more corresponding candidate elements associated with the second application for selection by the user. In addition, the method includes the steps of receiving the selection of at least one of the candidate elements and linking the selected candidate element with the first application such that a user may access the selected candidate element from the first application.

6 Claims, 4 Drawing Sheets

(56) References Cited

U.S. PATENT DOCUMENTS

| | | | |
|---|---|---|---|
| 2013/0187957 A1* | 7/2013 | Andersson Reimer | G06Q 10/1093 345/684 |
| 2013/0191765 A1* | 7/2013 | Andersson Reimer | G06F 3/0488 715/762 |
| 2014/0189608 A1* | 7/2014 | Shuttleworth | G06F 3/0484 715/863 |
| 2014/0250120 A1 | 9/2014 | Mei et al. | |
| 2014/0250406 A1* | 9/2014 | Seo | G06F 3/0488 715/781 |
| 2014/0283142 A1* | 9/2014 | Shepherd | G06F 3/0482 726/30 |
| 2014/0380214 A1 | 12/2014 | Huang et al. | |
| 2015/0091936 A1* | 4/2015 | Peng | G09G 5/00 345/590 |
| 2015/0142435 A1* | 5/2015 | Kumar P.V. | G06F 3/04817 704/235 |
| 2015/0317063 A1* | 11/2015 | Felt | G06F 3/0488 715/835 |
| 2016/0313816 A1 | 10/2016 | Krishnakumar et al. | |
| 2016/0313866 A1 | 10/2016 | Pacheco et al. | |
| 2016/0313890 A1 | 10/2016 | Walline et al. | |

\* cited by examiner

METHOD AND SYSTEM FOR ENABLING THE SHARING OF INFORMATION BETWEEN APPLICATIONS ON A COMPUTING DEVICE

CROSS-REFERENCE TO RELATED APPLICATIONS

This application claims priority to and is a divisional of U.S. patent application Ser. No. 14/730,517 that was filed on Jun. 4, 2015 in the name of Carsten Michael Dietz and entitled "Method and System for Enabling the Sharing of Information Between Applications on a Computing Device," now having an issue date of Mar. 13, 2018 as U.S. Pat. No. 9,916,079, which claims priority to U.S. Provisional Patent Application No. 62/008,280, filed on Jun. 5, 2014. Each of the above identified priority applications is hereby incorporated herein by reference in its entirety.

FIELD OF TECHNOLOGY

The present description relates to systems and methods for enabling the sharing of information between applications on a computing device.

BACKGROUND

To perform or facilitate business or personal tasks in their daily lives, many people rely on applications installed on computing devices. On an individual basis, such applications are typically intended to address a particular function or a limited number of functions. As an example, a calendar application may be able to schedule an event and invite potential participants, while an email application can enable the participants to message each other about the event. While each application on its own may be useful for some purposes, performance of a task may require, or may be best performed through, the use of multiple applications. Although multiple applications typically can operate independently of each other, cooperation between them, such as through information sharing, may provide a better solution in some cases.

As the number of applications available to users of computing devices continues to grow, some users may want or need to utilize several applications together to perform tasks. Accordingly, setting up the sharing of information between multiple applications may be difficult and confusing for a typical user and may be tedious even for an advanced user, particularly when the number of applications involved is large. As such, methods that enable sharing of information between multiple applications can enable users to perform related tasks in a more efficient and user-friendly manner.

SUMMARY

A method of enabling the sharing of information between applications on a computing device is disclosed herein. The method can include the steps of receiving a global search request through a first application and—in response to the reception of the global search request—prompting for a search term from a user. The method may further include the steps of receiving the search term and—based on the received search term—automatically presenting one or more corresponding candidate elements associated with a second application for selection by the user. In addition, the method may include the steps of receiving the selection of at least one of the candidate elements and linking the selected candidate element with the first application such that a user may access the selected candidate element from the first application.

In one arrangement, automatically presenting the candidate elements may include automatically presenting one or more candidate elements associated with the second application and one or more candidate elements associated with other applications for selection by the user. In another arrangement, the first application can be in an active state, and the second application can be in a non-active state. In yet another arrangement, the first application and the second application may be part of a personal information manager application that is configured to support active and non-active states of the first and second applications. In one example, the personal information manager application and the first and second applications can be secure applications that are restricted from providing information to non-secure applications.

In one embodiment, the first application may include one or more information fields, and receiving the global search request through the first application may include receiving the global search request through one of the information fields of the first application. In another embodiment, linking the selected candidate element with the first application can include linking the selected candidate element with the information field of the first application. In yet another embodiment, receiving the global search request may include detecting a swiping in a first predetermined direction or first predetermined swiping pattern on a touch screen at the computing device.

The method may further include the steps of closing the first application, re-launching the first application, and receiving the selection of the linked selected candidate element. The method may also include the step of—in response to the reception of the selection of the linked selected candidate element—presenting information related to the linked selected candidate element through the first application. In one arrangement, presenting one or more corresponding candidate elements associated with the second application and the other applications for selection by the user can include presenting the corresponding candidate elements in one or more categories based on an association between the corresponding candidate elements and the second application and the other applications.

A method of presenting a linked element at a computing device is also disclosed herein. The method may include the step of—via a first application in an active state—receiving a global search request that includes a first search term. The method may also include the step of—in response to the reception of the global search request—automatically determining corresponding candidate elements from a set of elements accessible to the computing device. In one arrangement, the candidate elements may correspond to the first search term and may be associated with one or more other applications in non-active states. In addition, the method may also include the steps of presenting at least a portion of the candidate elements for selection by a user and receiving a user selection of at least one of the candidate elements.

The method may further include the step of generating a selectable link for the first application such that when the selectable link is selected, access to information related to the other application with which the candidate element is associated is enabled. Furthermore, the method can include the step of presenting the selectable link in an information field of the first application. In one arrangement, the first application and the other applications may be secure applications that are restricted from providing data to non-secure applications.

A computing device configured to present a linked element is also disclosed herein. The computing device may include a display unit, which may be configured to selectively present prompts for user input and to selectively present elements and links for selection by the user. The computing device may also include a processing unit, which may be configured to cause—in response to reception of a global search request at the computing device and through a first application—the display to present a prompt for a search term. The processing unit may be further configured to perform an automatic comparison based on the search term to generate one or more corresponding candidate elements associated with other applications. In addition, the processing unit may be configured to cause the display unit to present the candidate elements for selection by the user and—based on a selection of one or more of the candidate elements by the user—to generate a link to at least the selected candidate element such that selection of the link through the first application causes access to the selected candidate element.

The computing device may also include a memory unit, which may be configured to store data relating to one or more predetermined swiping patterns. In one arrangement, the processing unit may be further configured to perform an automatic comparison of user input with the data relating to the predetermined swiping patterns to detect a global search request. In another arrangement, the processing unit may be further configured to cause the display to present the generated link through the first application. In yet another arrangement, the processing unit can be further configured to cause the display to present the generated link through an information field of the first application. In another arrangement, the processing unit can be further configured to detect the selection of the generated link through the first application and to cause the display to present information of the selected candidate element associated with the generated link.

In one embodiment, the first application and the other applications may be part of a secure personal information manager installed on the computing device. In another embodiment, the processing unit can be further configured to cause the display to present the candidate elements for selection by the user in a plurality of categories that are based on the type of the other applications.

BRIEF DESCRIPTION OF THE DRAWINGS/FIGURES

The accompanying drawings, which are incorporated herein and form part of the specification, illustrate embodiments of the subject matter described herein and, together with the description, further serve to explain the principles of such subject matter and to enable a person skilled in the relevant art(s) to make and use the subject matter.

Applicants expressly disclaim any rights to any third-party trademarks or copyrighted images included in the figures. Such marks and images have been included for illustrative purposes only and constitute the sole property of their respective owners.

The features and advantages of the embodiments herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following detailed description refers to the accompanying drawings that illustrate exemplary embodiments; however, the scope of the present claims is not limited to these embodiments. Thus, embodiments beyond those shown in the accompanying drawings, such as modified versions of the illustrated embodiments, may nevertheless be encompassed by the present claims.

References in the specification to "one embodiment," "an embodiment," "an example embodiment," "one arrangement," "an arrangement" or the like, indicate that the embodiment or arrangement described may include a particular feature, structure, or characteristic, but every embodiment may not necessarily include the particular feature, structure, or characteristic. Moreover, such phrases are not necessarily referring to the same embodiment or arrangement. Furthermore, when a particular feature, structure, or characteristic is described in connection with an embodiment or arrangement, it is submitted that it is within the knowledge of one skilled in the art to implement such feature, structure, or characteristic in connection with other embodiments or arrangements whether or not explicitly described.

Several definitions that apply throughout this document will now be presented. The term "exemplary" as used herein is defined as an example or an instance of an object, apparatus, system, entity, composition, method, step or process. The term "communicatively coupled" is defined as a state in which two or more components are connected such that communication signals are able to be exchanged between the components on a unidirectional or bidirectional (or multi-directional) manner, either wirelessly, through a wired connection or a combination of both. In addition, components may be communicatively coupled through direct or indirect connections, or a combination thereof. A "computing device" is defined as a component that is configured to perform some process or function for a user and includes both mobile and non-mobile devices. The terms "computer program medium" and "computer readable medium" are defined as one or more non-transitory components that are configured to store instructions that are to be executed by a processing unit.

An "application" or an "app" is defined as a program or programs that perform one or more particular tasks on a computing device. Examples of an application include programs that may present a user interface for interaction with a user or that may run in the background of an operating environment that may not present a user interface while in the background. An "active application" is defined as an application in a state such that a user can interact with or begin interacting with the application without starting or launching it. A "non-active application" is defined as an application in a state such that the user must start, launch or re-launch the application in order to interact with it. That is, non-active applications may run in the background of a device while it is powered on.

The term "secure application" is defined as an application that has been modified or enhanced from its original form to restrict communications between the application and unauthorized programs, applications or devices and to restrict operation of the application based on policy or to alter, augment or add features associated with the operation of the application (or any combination thereof) or—in the case of the application not being modified—an application that is part of a secure workspace that is protected from data exchanges with applications that are part of a personal or an unsecure workspace. An "enterprise application" is defined as an application that is associated with an enterprise such that a user interacting with the application is performing an operation of behalf of the enterprise during at least some part of the time during the interaction, though not necessarily for each interaction. A "target application" is defined as an application that has been selected for conversion into a secure application. An "unsecure application" is defined as an application that has not undergone the modification required to convert the application into a secure application and, as such, is unable to obtain data from a secure application in view of an obfuscation scheme employed by that secure application or is an application that is not part of a secure workspace and is restricted from accessing data from the secure workspace.

The term "information field" is defined as a logical allocation in which data or information may be entered, stored or displayed. As an example, a calendar application may include various information fields such as the time, location, and duration of a scheduled event. The term "element" is defined as data that can be stored on or accessed by components of a computing device. The term "link" or "shortcut" is defined as a representation associated with an element and presentable for selection, such that selection of the link or shortcut enables execution of, access to or viewing of the element. The term "setting" is defined as a state or condition or some relation to a state or condition.

The term "global search request" is defined as a request for information across a number of applications stored on or accessible by a computing device. As an example, the search term may include one or more words or phrases, whole or partial. The output of the global search request may include a listing of or links to at least a portion of elements that are related to the search term in some appropriately-defined manner, such as the returned elements having titles or content that include the search term.

The term "operating system" is defined as a collection of software components that directs a computing device's operations, including controlling and scheduling the execution of other programs and managing storage, input/output and communication resources. A "processing unit" is defined as one or more components that execute sets of instructions, and the components may be disparate parts or part of a whole unit and may not necessarily be located in the same physical location. The term "memory" or "memory element" is defined as one or more components that are configured to store data, either on a temporary or persistent basis. In addition, memory may include a combination of removable, permanent, or semi-permanent components.

An "interface" is defined as a component or group of components that enable(s) the device to receive input and to present information, whether through visual, audio, written, tactile or other methods, or any combination of such. A "display" is defined as a component or group of components that enable(s) the device to present information, content, settings, or the like through visual, audio, tactile, or other methods. A display may be separate from an interface, or may include or be combined with one or more interfaces. A "transceiver" is defined as a component or a group of components that enable(s) a device to communicate with one or more different devices, whether through hard-wired connections, wireless connections or a combination of both.

A "user gesture" is defined as one or more physical actions performed by a user that can be detected by a computing device through any appropriate input technique, including tactile, motion, audio or visual. For example, a user gesture may be a single action or may include a series of individual actions performed sequentially or together. The term "swiping" is defined as movement along one or more paths or directions that is intended to be translated to an input device that is configured to detect such movement.

As explained earlier, a user of a computing device may wish to utilize multiple applications on the device to perform personal or business tasks, which may involve sharing of information between the applications. The process of setting up the information sharing may be difficult and time-consuming, particularly when the number of applications involved is large.

A method and system for enabling the sharing of information between applications on a computing device are described herein to address this problem. In particular, the method includes the steps of receiving a global search request through a first application and—in response to the reception of the global search request—prompting for a search term from a user. The method further includes the steps of receiving the search term and—based on the received search term—automatically presenting one or more corresponding candidate elements associated with a second application for selection by the user. In addition, the method includes the steps of receiving the selection of at least one of the candidate elements and linking the selected candidate element with the first application such that a user may access the selected candidate element from the first application.

As such, the method and system provide an easy way for information from multiple applications on the computing device to be shared. Such a feature may enable typical or basic users to take advantage of information sharing across multiple applications, as those users may not otherwise even attempt such a challenge. In addition, time savings and efficiency in setting up the information sharing may be realized, even for sophisticated users of the device.

Figure 1:
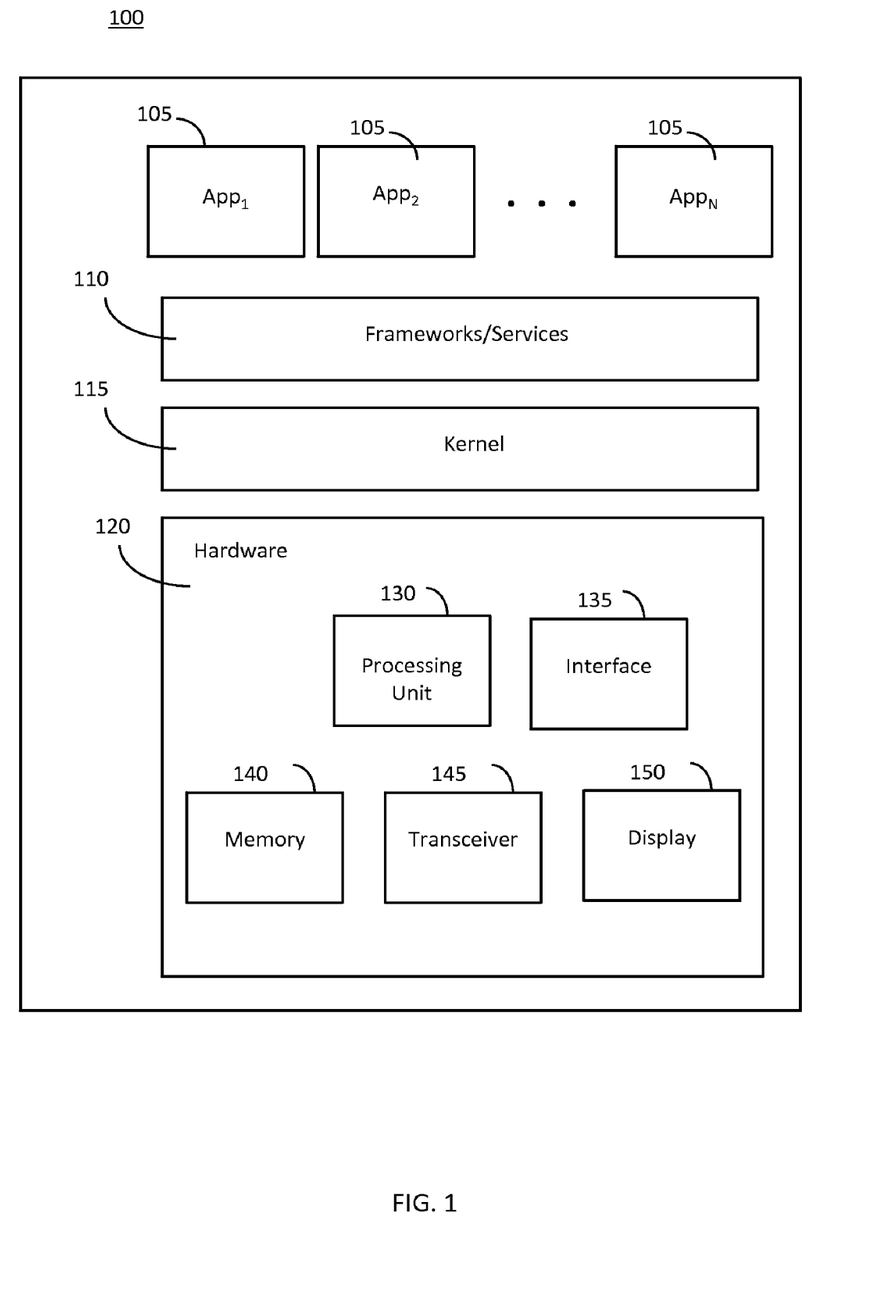
FIG. 1 illustrates an example of a block diagram of a computing device that is capable of sharing information between multiple applications on the device.

Referring to FIG. 1, an example of a computing device 100 that enables sharing of information between multiple applications 105 is shown. The device 100 can include one or more applications 105, which may be completely or partially installed on the device 100 or elsewhere, such as on a server (not shown) to which the device 100 is communicatively coupled. As an example, the computing device 100 may be enabled to cause execution of an application 105 that actually executes at the server.

As is known in the art, the computing device 100 may include a frameworks/services level 110 that provides several abstraction layers that include system interfaces and that facilitate operation of the applications 105 and other functions of the device 100. As is also known in the art, the computing device 100 can include a kernel 115, which provides interfaces for the frameworks/services level 110 to interact with a hardware layer 120. The architecture of the computing device 100 may further include other abstraction layers and modules or libraries to enable applications that may be installed on the device 100 to interact with the components described here and other elements of the device 100.

As shown in the hardware layer 120, the computing device 100 may include a processing unit 130, an interface 135, a memory unit 140, a transceiver 145, and a display 150, any of which may be communicatively coupled to the processing unit 130. The interface 135 may include one or more components that are configured to accept input from a user or other device, such as a mouse, keyboard, a touch screen, a microphone, or any other suitable component. The display 150 may be configured to present data, information or the like to a user or some other component and may include, for example, a graphical display, speakers, or any other suitable component. As previously mentioned, the display 150 may be separate from the interface 135, may include the interface 135, or may be combined with one or more interfaces 135. For instance, a touch screen may perform the functionality of both the interface 135 and the display 150. The memory unit 140 may be a single memory unit or may be comprised of multiple memory units that may operate independently or jointly and can include persistent memory, non-persistent memory or both. The transceiver 145 may be configured to support either wired or wireless communications with a variety of components, such as other computing devices, external networks, landline phones, desktop computers or the like, and may be configured to operate in accordance with various protocols. The computing device 100 may include multiple processing units 130, interfaces 135, transceivers 145, and displays 150 to carry out any of the functions described herein.

Figure 2:
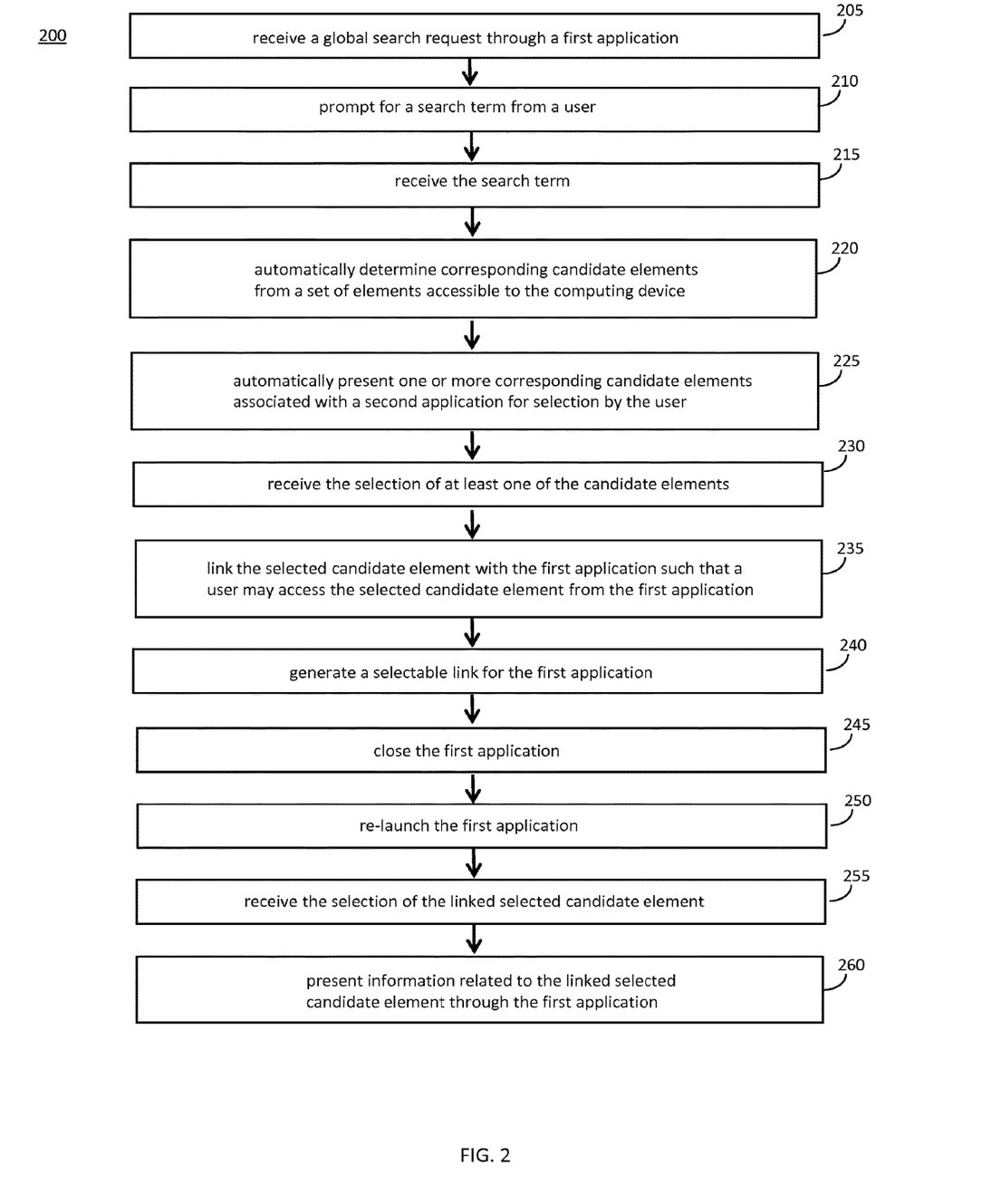
FIG. 2 illustrates an example of a method for sharing information between multiple applications on a computing device.

Referring to FIG. 2, a method 200 of enabling the sharing of information between applications on a computing device 100 is shown. It is important to note that the method 200 may include additional or even fewer steps or processes in comparison to what is illustrated in FIG. 2. Moreover, the method 200 is not necessarily limited to the chronological order that is shown in FIG. 2. In describing the method 200, reference may be made to FIGS. 1 and 3-4, although it is understood that the method 200 may be practiced with any other suitable systems, interfaces and components.

In the first part of the method 200, steps 205-230 represent an example of how a user may initiate a global search from a first application in which the search may cover the first application and/or one or more second applications or other programs. The second part of the method, steps 235-260, represent an example of how a global search can enable a user to link information from one application to another.

At step 205, a global search request may be received through a first application, and in response to the reception, a search term may be prompted from a user at step 210, which may be received at step 215. As will be explained later, in some embodiments, reception of the global search request through the first application may occur in connection with one or more information fields included as part of the first application. Such reception, however, is not so limited and may occur through the first application without going through an information field. In fact, in some embodiments, the global search request does not even need to be received through the first or any application.

The global search request may be received through any suitable technique, including tactile, audio or visual. As an example, a user may initiate a global search request by performing a user gesture, such as a swiping of a touch screen included in the display 150 at the computing device 100. As another example, the user may press a button displayed on the touch screen, or may use a combination of pressing and swiping.

Figure 3:
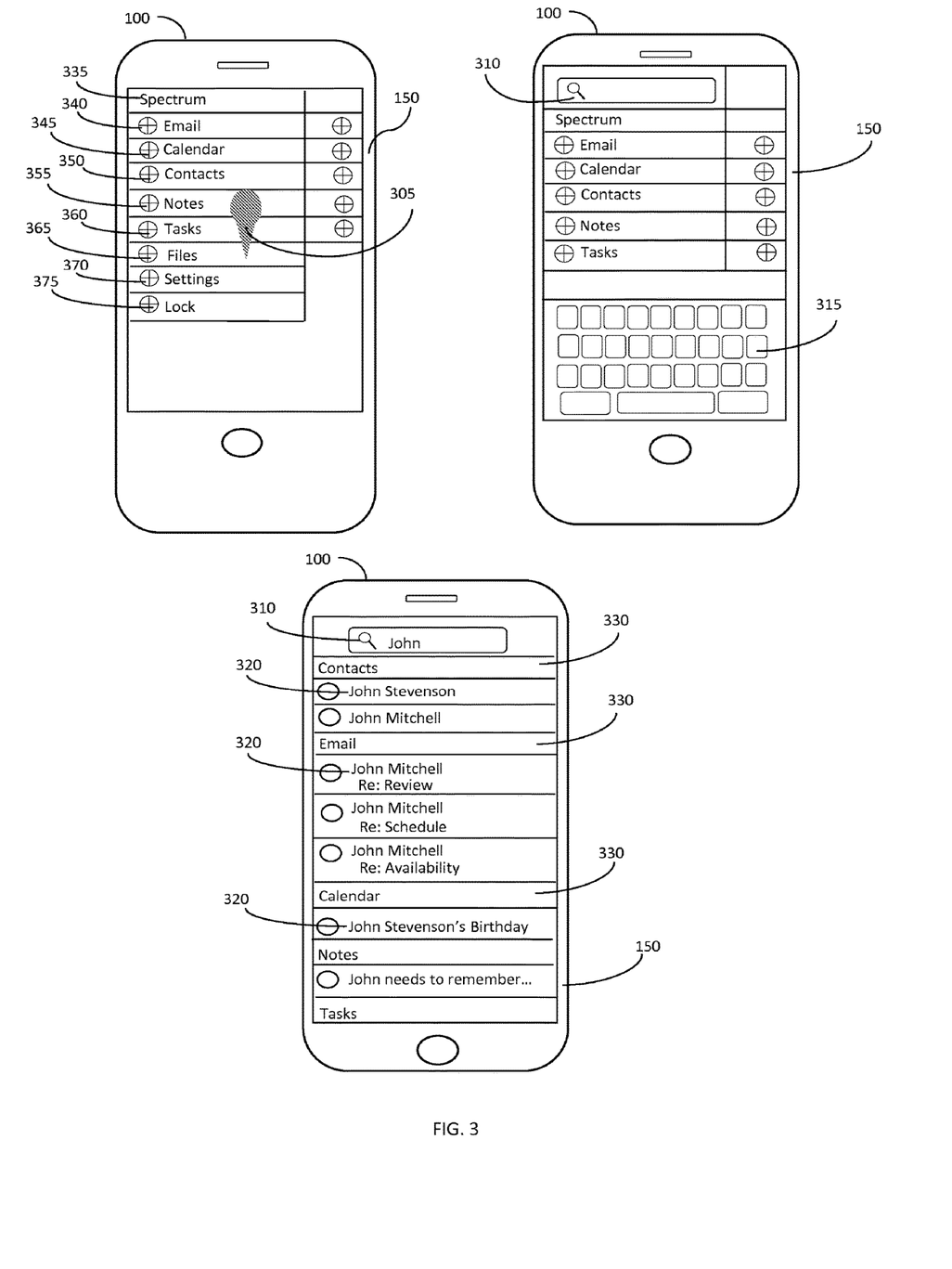
FIG. 3 illustrates an example of operations performed on a computing device to enable a global search request on the device.

Referring to FIG. 3, an example of performance of a global search request is shown at the computing device 100 on a touch screen display 150. The shape depicted as 305 (the grey circle attached to a triangular arrow pointing in a downward direction along the touch screen display 150) represents the performance of a user gesture that includes contact with or a pressing of the touch screen display 150, followed by motion of the input mechanism in the direction of the arrow. As an example, in response to this gesture, a dialog box 310 may be presented to the user, through which the user may enter appropriate search terms, as will be explained below. Although this user gesture may serve as a global search request, the example is certainly not limiting, as any other appropriate user gesture can be used, including swiping in any direction or pattern or multiple swipings performed sequentially or together.

It should also be noted that actions such as pressing and motion, which may be part of a user gesture, can be performed using any appropriate input mechanism, including one or more fingers of the user or a stylus. In addition, such actions may be performed without direct contact between the input mechanism and the touch screen display 150. As an example, the user's finger can hover in proximity to the touch screen display 150 and the gesture can be detected through the use of a motion detection technique. In any case, the detected user gesture may be compared to one or more predetermined gesture patterns using techniques such as pattern recognition, text parsing or the like. The predetermined gesture patterns can be associated with desired actions, which may occur in response to successful matching of the user gesture with one or more of the patterns. Examples of desired actions include the performance of a global search request, powering down of the device or opening a program, but are not limited to these and may include any other suitable action. The associations between patterns and desired actions can be created or implemented by any appropriate entity such as an administrator or user of the device 100, or may be included as part of the software or of a software update.

In addition, the initiation of a global search request is not limited to user gestures, and can be performed using other techniques. For example, voice recognition may detect a predetermined word or phrase, such as "global search" or the like, to cause initiation of a global search. As another example, the user may initiate the global search request by selecting an option on a menu or by inputting an appropriate word or phrase, such as "global search," using previous touch screen techniques or through the use of an input device included in the interface 135 or otherwise connected to the computing device 100, such as a mouse or keyboard. As yet another example, the global search request may come from another component that is communicatively coupled to or part of the computing device 100. For instance, the global search request may be initiated through another device engaged in a remote session with the computing device 100.

As mentioned earlier, a search term may be prompted from the user in response to the reception of the global search request, and the search term may be received. The prompting may be performed using any suitable technique, such as the displaying of the dialog box 310 at the computing device 100 for user input or the use of an audio prompt such as "please enter a search term." Referring once again to FIG. 3, an example of prompting for a search term is shown. In this example, the user is prompted to enter a search term in the dialog box 310 using the displayed (soft) keypad 315 on the computing device 100 on the touch screen display 150. It should be noted that additional techniques, such as auto-completion, may be employed in conjunction with the user entry of the search term. That is, before, while or after the user enters the search term, suggested results may be displayed for possible selection. The suggested results may be based on the partial entry of the search term or any other suitable information.

As another example, the user may speak a search term that can be received and detected using speech recognition or other techniques at the computing device 100 or elsewhere. It should be noted that these examples serve only to illustrate the concepts of prompting for and receiving the search term, and any suitable techniques may be employed, including those previously described.

It should also be noted that in some embodiments, the global search request itself may include a search term. In one embodiment, a user may type or enter the search term in a dialog box, and then initiate the global search on the entered search term. In another embodiment, the user may speak a phrase such as "global search baseball," which may cause a global search using the search term of "baseball." In these embodiments, although the global search request includes a first search term, additional search terms may still be prompted for and may replace or augment the first search term for purposes of the global search.

In one arrangement, the global search request may be received through a first application 335. In this example, the first application 335 may be an application that is made up of several other applications. This configuration is shown in FIG. 3, as the first application 335 may provide access to an email application 340, a calendar application 345, a contacts application 350, a notes application 355 and/or a tasks application 360. Of course, the first application 335 may not necessarily be comprised of other applications, and the listing of applications here that form the first application 335 is not meant to be exhaustive. In fact, any combination of the applications 340-360 may be part of the first application 335. The first application 335, as another example, may provide access to a file database 365, a settings section 370 and/or a locking mechanism 375. In this case, because it is made up of other applications that involve social or business events and contacts, the first application 335 may be referred to as a personal information manager (PIM) application.

As an example, initiating a global search request through the first application 335 may cause a search to be performed across one or more applications installed on the device 100. Here, the search may be performed on the applications 340-360 that form the first application 335, the file database 365 and any other suitable program or repository. Even though the search may be conducted over a wide variety of applications, programs or databases on the device 100, the search may be restricted to only certain elements. For example, the search may be restricted to secure applications, applications that comprise the first application 335 or applications that are associated with one another, such as those that are signed by the same developer or entity. This restriction can ensure the protection of confidential data from unauthorized applications or programs.

As another example, the domain involved in the global search may be the entire universe of elements stored on or accessible to the device 100. However, this example is not limiting, as the domain may be just a portion of that universe of elements. In another example, the global search may target only those elements stored on the device 100 that are associated with one particular user's account on the device 100, which may be set up to support accounts for multiple users. In yet another example, the global search may target only the secure elements accessible to the device 100, while ignoring the non-secure elements.

Referring once again to the method 200 of FIG. 2, once the global search is initiated, candidate elements from a set of elements accessible to the computing device 100 may be automatically determined at step 220. At step 225, one or more of the candidate elements may be automatically presented to the user and at step 230, selection of at least one of the candidate elements may be received.

As noted earlier, determination of the candidate elements may be at least partially based on a global search of the received search term against a particular collection of data, such as the applications 340-360 or other programs stored on or accessible to the device 100, or a portion thereof. As an example, the items that are associated with the searched collections of data may be referred to as elements, and an element that matches or substantially matches a search request may be referred to as candidate elements. In one embodiment, the elements may be of different types, such as emails and calendar events in a user's account, but not necessarily so. The elements may be two or more different types and may even be just a single type. It should be pointed out that the collection of data that is searched may be specified by the user, or may be predetermined by the user or another person, such as an administrator, or may even be specified by the software. There are several examples of candidate elements 320 shown at the bottom of FIG. 3.

In one arrangement, an element may be determined to be a candidate element 320 if the element includes the search term in at least one of its parts, including, but not limited to, the title, subject, description or content of the element. In another arrangement, particularly for a search term that includes multiple terms, the previous criteria may be extended to cover one, all, or any number of the multiple terms in the search term. As such, the multiple terms may be required to be in some type of order, but this need not be the case. In fact, these arrangements only serve as examples, and any technique known in the art of searching may be used to determine the candidate elements.

The candidate elements 320 may be presented to the user in any suitable manner for selection, display or other purpose. In one embodiment, all of or a portion of the candidate elements 320 can be presented to the user in some fashion, such as alphabetical order. In another embodiment, all of or a portion of the candidate elements 320 can be presented to the user in one or more categories 330 based on an association between the corresponding candidate elements 320 and the type of element or an application that typically executes the element. For instance, files that are determined as candidate elements 320 may be included as part of a "files" category 330 or as part of a "file manager" category 330 associated with an application that can execute storage and access to the files. As another example, emails that are candidate elements 320 may be grouped together in an email category 330. In addition, the number of candidate elements 320 determined or presented for each category 330 may be limited to a maximum value appropriately specified, but this need not be the case.

An example of presenting candidate elements 320 in multiple categories 330 according to type or associated application for execution is shown at the computing device 100 on the touch screen display 150. In the example, the search term "John" is entered in the dialog box 310, and a global search on that term generates corresponding candidate elements 320, which are presented according to categories 330 that include contacts, email, calendar, and notes. Note that the candidate elements 320 are related to the search term in some manner, which may be different for each of the categories 330 or type of associated application. Accordingly, in this example, the contacts category 330 includes two contacts with the first name John, the email category 330 includes some emails sent by John Mitchell, and the calendar category 330 includes an event that contains John Stevenson's name in its title. While this example serves to illustrate candidate elements resulting from a global search, it is certainly not limiting. For instance, the candidate elements 320 in the email category 330 for the search term "John" may include emails with that name somewhere in the body of the message, though not sent from or to any person named John.

Once the candidate elements 320 are presented, the user may select one or more of them, such as to access information that is associated with the selected candidate element 320. For example, the user may select the candidate element 320 that includes contact information about a person named John to acquire a contact number for that individual. As can be seen, this process enables a user to conduct a global search at a first application, with various applications, programs and repositories being the focus of the search.

In addition to simply choosing a candidate element 320 to obtain information, a user may be able to integrate links into a first application through selection of a candidate element 320. Such selection of the candidate elements 320 may be performed using any previously-described techniques, including tactile or audio, or may be performed through the use of a menu. The selection may also be performed at a remote location with respect to the computing device 100. One or more of the candidate elements 320 may be selected, and in the case of multiple elements 320, selection may be performed sequentially or together, and the selection may be received at the computing device 100.

In one arrangement, the determined candidate elements 320 can be associated with a second application and can be presented as such. In other arrangements, a portion of the candidate elements 320 may be associated with the second application, while another portion may be associated with other applications, which may even include the first application in some of those arrangements. Accordingly, the automatic presentation of the candidate elements 320 for user selection may include the presentation of one or more candidate elements 320 associated with the second application and the presentation of one or more candidate elements 320 associated with other applications. In addition, the automatic presentation of the candidate elements 320 in one or more categories 330 may be based on an association between the corresponding candidate elements 320 and the second application and the other applications.

Referring once again to the method 200 shown in FIG. 2, the selected candidate element associated with a second application may be linked with the first application at step 235 such that a user may access the selected candidate element from the first application. At step 240, a selectable link for the first application may be generated such that when the selectable link is selected, access to information related to the second application is enabled.

As described earlier, the candidate elements 320, including the selected ones, can be associated with one or more other applications. In one embodiment, the selected candidate element 320 is associated with a second application, and a link between the selected candidate element 320 and the first application enables information sharing between the first and second applications. Recall that a link is a representation associated with an element, and selection of the link can enable execution of, viewing of or other access to the element.

In one arrangement, the link may be presented to the user for selection on the display 150, and may include words or phrases to indicate the identity of the linked element. For instance, a link to an email may include the subject of the email. The visual representation of the link may be formatted in a manner that indicates that it actually is a link, for instance through underlining, italics or bold face or encapsulation within a shape such as an ellipse.

Figure 4:
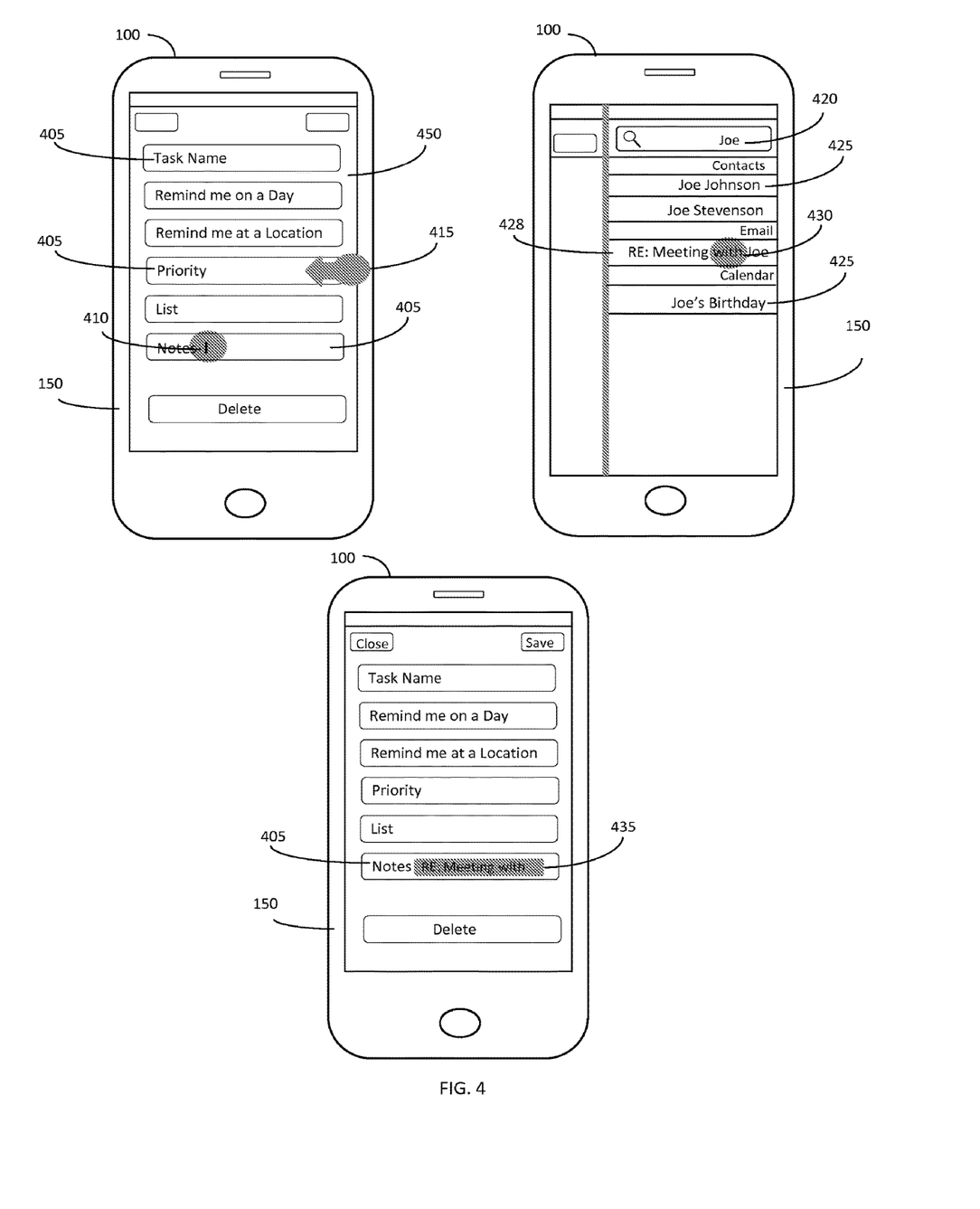
FIG. 4 illustrates another example of operations performed on a computing device to enable sharing of information between multiple applications on the device.

Referring to FIG. 4, an example of presenting a selectable link through a first application 450 to an element associated with a second application is shown on the computing device 100 using a touch screen display 150. In this example, a global search request is received through a first application 450, which in this case is a calendar or other application that can create and track tasks. Also, the first application 450 may include several information fields 405, such as the task name, priority, reminder settings, list information and notes.

In this case, the global search request may be initiated through the first application 450 via the user pressing the touch screen display 150 at a location within the visual boundaries of the first application 450, such as the circle 410. It should be noted that this example of pressing the touch screen display 150 at the circle 410 is not limiting. In this and other embodiments, any of the previously described techniques can be used to indicate that a global search is to be performed through a certain information field, including through the use of user gestures, menus, audio or the like.

Returning to the example shown in FIG. 4, the pressing of the circle 410 may result in a cursor appearing within the notes information field 405. A global search request may then be initiated with a user gesture, such as the one depicted by the shape 415, in which an input mechanism (such as the user's finger) presses the touch screen display 150 at the circular portion of 415 and swipes to the left along the touch screen display 150. The fact that the cursor was located in the notes information field 405 while the global search request was initiated may result in the global search being started through the notes information field 405. However, this example is certainly not limiting, and the global search request may be performed in any other suitable manner, including through the use of a menu.

As an example, in response to a global search performed using the search term "Joe" input into the dialog box 420, candidate elements 425 and 428 are presented to the user for selection, with the particular candidate element 428 being an email labeled "RE: meeting with Joe." This candidate element 428 may be associated with the second application or any other application, including the first application 450. Selection of the email 428 depicted by the button press 430 results in the email 428 being linked to the "notes" information field 405 of the first application (calendar). Accordingly, a link 435 to the selected email 428 can be generated and presented to the user as part of the notes information field 405, in this example, with the title of the email 428 appearing in the notes information field 405 encapsulated by an elliptical shape. Selection of the link 435 can enable user access to the email 428 through the first application 450, which may include opening the email 428, replying to it or other suitable actions. As such, the user may establish links to various pieces of information associated with applications that are different from the application through which the link is presented.

In this example and other embodiments, selection of the link to the element associated with the second application may cause viewing, execution or other access to the element. As in the previous example, selection of a link to an email may cause opening of the email or replying to it. As another example, selection of a link to a contact may cause the computing device 100 to place a phone call to the contact or to inquire if the user would like to place that call. It should be pointed out that different selection actions for a particular element may cause different resulting actions to be performed on that element. For instance, left-clicking of a mouse on the link may cause execution of the element (by the second application) while right-clicking on the element may produce other options for the user, such as the ability to view the properties or location of the element. These examples are not limiting, as any appropriate actions may be performed in response to selection of the corresponding link.

Returning to the method 200 shown in FIG. 2, the first application, which may provide a link to a selected candidate element associated with the second application, may be closed at step 245 and re-launched at step 250. At step 255, selection of the linked selected candidate element may be received through the first application. In response to the reception, information related to the linked selected candidate element may be presented at step 260.

In some embodiments, a link to the selected candidate element or its corresponding application of execution may be created and made available without the first application needing to be closed and re-launched. In other embodiments, however, these or other steps may be required in order for the selectable link to be presented or functional. These scenarios may result from settings associated with the first application, the functionality or inherent nature of the first application, the way in which the software (or an update to it) for the first application was written or other suitable reason. In any case, the link may be selected to cause information related to the selected candidate element to be presented, as previously described. In addition, the selection may also cause other actions, such as execution or viewing of the selected candidate element.

In another arrangement, the computing device 100 may support either secure or non-secure applications or both. A secure application may be an application that has been adapted or wrapped to secure the application from interactions from unauthorized applications or programs and to enable management of the application. Such management may include limiting the application to only processing requests from other secure or authorized applications or creating a whitelist of sites that the application is permitted to access. As another example, the secure application may be forced to request a passcode or some other authentication information from a user before it may be launched or executed. The secure application may also be restricted to operating in secure workspaces installed on the computing device 100. Additional information relating to secure applications and their management can be found in U.S. Pat. No. 8,695,060, issued on Apr. 8, 2014, which is incorporated herein by reference.

As an example, a PIM application operating on the computing device 100 may support either secure or non-secure applications or both simultaneously. The PIM application may also be configured to support applications in both active and non-active states, and the information sharing techniques described above may be applied to applications in either the active or non-active states or both. For instance, information may be shared (in either direction) between a first application in an active state and a second application in a non-active state. In some embodiments, a secure PIM application may support a first and second application, both secure, and techniques previously described for sharing of information may be employed between those two secure applications. However, the techniques are not so limited and actually may be applied to any combination of secure and non-secure applications. In one such embodiment, a non-secure application may provide information to one or more secure applications, while the secure applications may be restricted from providing information to the non-secure application. In this scenario, the incorporation of a link in a first secure application to information associated with a second secure application or a second whitelisted non-secure application may be permitted. In contrast, the incorporation of a link in a secure application to information associated with an unauthorized non-secure application may be blocked.

While various embodiments have been described above, it should be understood that they have been presented by way of example only, and not limitation. It will be understood by those skilled in the relevant art(s) that various changes in form and details may be made therein without departing from the spirit and scope of the subject matter as defined in the appended claims. Accordingly, the breadth and scope of the present subject matter should not be limited by any of the above-described exemplary embodiments, but should be defined only in accordance with the following claims and their equivalents. The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

What is claimed is:

1. A computing device configured to present a linked element, comprising:
    a housing;
    a display unit mounted to the housing, wherein the display unit is configured to:
        selectively present prompts for user input; and
        selectively present elements and links for selection by a user;
    a processor disposed in the housing, wherein the processor is configured to:
        cause, in response to reception of a global search request at the computing device and through a first application that is installed on the computing device, the display to present a prompt for a search term;
        perform an automatic comparison based on the search term to generate one or more corresponding candidate elements associated with other applications that are installed on the computing device;
        cause the display unit to present the candidate elements for selection by the user; and
        based on a selection of one or more of the candidate elements by the user, generate a link to at least the selected candidate element and incorporate the generated link into the first application, such that selection of the link through the first application causes access to the selected candidate element; and a memory unit, wherein the memory unit is configured to store data relating to one or more predetermined swiping patterns, and wherein the processor is further configured to perform an automatic comparison of user input with the data relating to the predetermined swiping patterns to detect a global search request.

2. The computing device according to claim 1, wherein the processor is further configured to:

detect the selection of the generated link through the first application; and cause the display to present information of the selected candidate element associated with the generated link.

3. The computing device according to 1, wherein the first application and the other applications are part of a secure personal information manager installed on the computing device.

4. The computing device according to claim 1, wherein the processor is further configured to cause the display to present the candidate elements for selection by the user in a plurality of categories that are based on the type of the other applications.

5. The computing device according to claim 1, wherein said causing access to the selected candidate element comprises causing access to the selected candidate element through the first application.

6. The computing device according to claim 1, wherein said causing access to the selected candidate element comprises presenting information related to the selected candidate element through the first application.

* * * * *